(12) United States Patent
Yamashita et al.

(10) Patent No.: US 8,347,627 B2
(45) Date of Patent: Jan. 8, 2013

(54) CARBON-DIOXIDE-CAPTURE-TYPE STEAM POWER GENERATION SYSTEM

(75) Inventors: Katsuya Yamashita, Tokyo (JP); Asako Inomata, Yokohama (JP); Yukio Oohashi, Yokohama (JP); Takashi Ogawa, Yokohama (JP); Kazutaka Ikeda, Tokyo (JP); Takeo Suga, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 797 days.

(21) Appl. No.: 12/553,317

(22) Filed: Sep. 3, 2009

(65) Prior Publication Data

US 2010/0050637 A1    Mar. 4, 2010

(30) Foreign Application Priority Data

Sep. 4, 2008 (JP) ................... 2008-227376
Jun. 22, 2009 (JP) ................... 2009-147974

(51) Int. Cl.
*F01K 13/02* (2006.01)
*F01K 17/00* (2006.01)

(52) U.S. Cl. ............ 60/646; 60/657; 60/653; 60/679; 423/220

(58) Field of Classification Search ............ 60/646, 60/653, 657, 677–679; 96/236; 423/220
See application file for complete search history.

(56) References Cited

U.S. PATENT DOCUMENTS

| | | | |
|---|---|---|---|
| 3,288,557 A * | 11/1966 | Bresler | 423/229 |
| 4,112,050 A | 9/1978 | Sartori et al. | |
| 4,112,051 A | 9/1978 | Sartori et al. | |
| 4,112,052 A | 9/1978 | Sartori et al. | |
| 4,364,915 A * | 12/1982 | Proctor | 423/437.1 |
| 4,409,191 A * | 10/1983 | Osman | 423/220 |
| 4,542,114 A * | 9/1985 | Hegarty | 502/39 |
| 5,339,633 A * | 8/1994 | Fujii et al. | 60/648 |
| 6,274,108 B1 * | 8/2001 | Fujii et al. | 423/228 |
| 2007/0283813 A1 | 12/2007 | Iijima et al. | |

FOREIGN PATENT DOCUMENTS

| | | |
|---|---|---|
| JP | 61-071819 A | 4/1986 |
| JP | 05-301023 A | 11/1993 |

(Continued)

OTHER PUBLICATIONS

A.K. Chakraborty et al, "$CO_2$ Absorption in Aqueous Solutions of Hindered Amines", Chemical Engineering Science, vol. 41, No. 4, pp. 997-1003, 1986.

*Primary Examiner* — Hoang Nguyen
(74) *Attorney, Agent, or Firm* — Foley & Lardner LLP (57) ABSTRACT

A carbon-dioxide-capture-type steam power generation system 1 according to the present invention comprises a boiler 6 producing an exhaust gas 5 by combusting a fuel 2 and having a flue 8; an absorbing unit 40 being configured to absorb the carbon-dioxide contained in the exhaust gas 5 into an absorbing solution; and a regenerating unit 44 being configured to release the carbon dioxide gas from the absorbing solution absorbing the carbon dioxide and discharge the released carbon dioxide gas. Further, in this system, a reboiler 49 is provided for receiving a heating-medium as heat source, producing a steam 43 and supplying the produced steam 43 to the regenerating unit 44. Additionally, in the flue 8 of the boiler 6, a boiler-side heat exchanger 61 is provided for heating the heating-medium by the exhaust gas 5 passing therethrough.

11 Claims, 3 Drawing Sheets

FOREIGN PATENT DOCUMENTS

| | | |
|---|---|---|
| JP | 07-031834 A | 2/1995 |
| JP | 07-232033 A | 9/1995 |
| JP | 08-252430 A | 10/1996 |
| JP | 2004-323339 A | 11/2004 |
| JP | 2005-254212 A | 9/2005 |
| JP | 2006-342032 A | 12/2006 |

* cited by examiner

CARBON-DIOXIDE-CAPTURE-TYPE STEAM POWER GENERATION SYSTEM

BACKGROUND

1. Technology Field

The present invention relates to a carbon-dioxide-capture-type steam power generation system for capturing carbon dioxide from exhaust gas produced when steam is produced by combusting fuel in a boiler, by using an absorbing solution for absorbing the carbon dioxide, while generating electric power. In particular, this invention relates to the carbon-dioxide-capture-type steam power generation system which can restrain the power generation efficiency from lowering and can take out energy required for capturing the carbon dioxide from the exhaust gas.

2. Background Art

Recently, in the field of thermal power generation equipment, intensive study for enhancing power generation efficiency has been made in view of environmental preservation. For instance, in usual thermal power generation equipment, the temperature of the steam used for operation of a steam turbine is 600° C. or so. However, the recent study has been aimed at enhancing the power generation efficiency by further elevating the steam temperature.

As methods for enhancing the power generation efficiency, a coal-gasification-combined-cycle power generation using coal which is a fossil fuel that is of great reserves and available at a relatively low price, and a steam power generation utilizing supercritical pressure steam produced by a pulverized coal boiler are known. Among them, the coal-gasification power generation can enhance the power generation efficiency by elevating temperature of the gas supplied to a gas turbine. Meanwhile, the steam power generation can enhance the power generation efficiency by driving the steam turbine, while elevating the temperature and pressure of the steam (or turbine steam) produced by the dust coal boiler and supplied to the steam turbine. In fact, in this steam power generation, it has been attempted to enhance the power generation efficiency by elevating the temperature of the turbine steam up to 700° C. or higher, presenting some expectations of commercialization in the near future.

Incidentally, in recent years, the so-called greenhouse effect due to carbon dioxide has been pointed out as a major cause of global warming. Thus, there is an urgent need to restrain from emitting the carbon dioxide, in order to preserve the earth's environment. To this end, one method for capturing the carbon dioxide contained in the exhaust gas, by contacting the exhaust gas generated in a thermal power plant or the like, with a carbon dioxide absorbing solution, has been intensively studied.

Generally, a carbon dioxide capturing system includes an absorbing unit being configured to absorb the carbon dioxide contained in the exhaust gas into the absorbing solution, and a regenerating unit being configured to release a carbon dioxide gas from the absorbing solution absorbing the carbon dioxide and discharge the released carbon dioxide gas containing the steam (see JP2004-323339A, JP2005-254212A, and JP2006-342032A). To the regenerating unit, a compressor compressing the carbon dioxide gas containing the steam which is discharged from the regenerating unit, and a reboiler producing the steam (or regenerating steam) by heating the absorbing solution which is supplied from the regenerating unit, are connected, respectively.

In the case of capturing the carbon dioxide by utilizing such a carbon dioxide capturing system, the exhaust gas generated by the boiler is supplied to a lower portion of the absorbing unit, while the absorbing solution is supplied to an upper portion of the absorbing unit. Thus, the exhaust gas containing the carbon dioxide and the absorbing solution are brought into countercurrent contact with each other, thereby the carbon dioxide contained in the exhaust gas is absorbed in the absorbing solution. The exhaust gas, from which the carbon dioxide has been taken out or removed, is discharged from the upper portion of the absorbing unit.

The absorbing solution absorbing the carbon dioxide is supplied to an upper portion of the regenerating unit from the absorbing unit, via a lean/rich heat exchanger. Meanwhile, high temperature regenerating steam, which is produced by heating the absorbing solution in the reboiler, is supplied to a lower portion of the regenerating unit. Thus, the absorbing solution absorbing the carbon dioxide and the regenerating steam are brought into countercurrent contact with each other, thereby the carbon dioxide gas is released from the absorbing solution absorbing the carbon dioxide. The carbon dioxide gas containing the steam is discharged from the regenerating unit and then compressed by the compressor. The compressed carbon dioxide gas is supplied and stored in desired equipment. In this way, the carbon dioxide gas contained in the exhaust gas can be captured. As a usual heat source for heating the absorbing solution to produce the steam in the reboiler, the turbine steam produced in the boiler and extracted therefrom is used.

The absorbing solution used for absorbing the carbon dioxide comprises an aqueous amine compound solution prepared by dissolving an amine compound (or compounds) in water. The following amine compounds are mentioned.

For instance, JP61-71819A discloses acidic gas scrapping compositions containing a non-aqueous solvent, such as a steric hindrance amines, a sulfolane, or the like. Among the steric hindrance amines, 2-amino-2-methyl-1-propanol or the like is mentioned as a steric hindrance primary mono-amino-alcohol. JP5-301023A discloses use of particular aqueous hindered amine solutions exemplified by hindered amines selected from the group consisting of 2-amino-2-methyl-1-propanol, 2-(methylamino)-ethanol, 2-(ethylamino)-ethanol, 2-(diethylamino)-ethanol, and 2-(hydroxyethyl)-piperidine. Alternatively, JP8-252430A discloses use of a mixed aqueous amine solution containing a secondary amine and a tertiary amine, respectively, at concentrations within a range of 10 to 45% by weight. Further, "Chemical Engineering Science" (Vol. 41, No. 4, pp. 997-1003) discloses behavior of an aqueous solution of 2-amino-2-2-methyl-1-propanol, one kind of the hindered amines, upon absorbing the carbon dioxide.

While such various kinds of absorbing solutions that can absorb the carbon dioxide have been reported, in any case of using the absorbing solution containing such an amine compound as described above, there is a need for directly contacting the absorbing solution with the exhaust gas containing the carbon dioxide, in order to capture the carbon dioxide from the exhaust gas.

Generally, the aqueous amine compound solution is prepared, as the absorbing solution, by dissolving the aforementioned amine compound or compounds in water. Such an absorbing solution causes an exothermic reaction when the carbon dioxide contained in the exhaust gas is absorbed into the absorbing solution, while this absorbing solution causes an endothermic reaction when the carbon dioxide is released from the absorbing solution absorbing the carbon dioxide. Therefore in the case of releasing the carbon dioxide from the absorbing solution, it is necessary to heat the absorbing solution. This is the reason that the high temperature regenerating steam produced by the reboiler is supplied to the regenerating unit and the absorbing solution absorbing the carbon dioxide is heated by the supplied regenerating steam in the regenerating unit. Incidentally, the concentration of the carbon dioxide that can be contained in the absorbing solution is increased, as the temperature of the absorbing solution is decreased. Therefore, in order to allow the carbon dioxide to be effectively absorbed in the absorbing solution, there is a need for positively cooling the absorbing solution so as to decrease the temperature of the absorbing solution.

As described above, in the case of capturing the carbon dioxide contained in the exhaust gas by using the aqueous amine compound solution, as the absorbing solution, some amount of heat is required for heating the absorbing solution absorbing the carbon dioxide. Specifically, the amount of heat, within a range of approximately 2.5 to 3.5 Mj/kg.CO2, is required. This amount of heat corresponds to approximately 10 to 20% of the heating value of the coal. Thus, when it is attempted to take out energy, corresponding to such a necessary amount of heat from the turbine steam that is originally used for rotating the steam turbine, the energy required for rotating the steam turbine is decreased by the amount. This leads to lowering of the power generation efficiency. However, in the case of capturing the carbon dioxide without utilizing the aqueous amine compound solution, it has been also reported that the power generation efficiency may be further lowered. Generally, in such a case, it has been known that the power generation efficiency may be lowered by about 30%.

In addition, in order to elevate the temperature of the turbine steam up to about 700° C., several challenges to be overcome still remain. For instance, if the temperature of the turbine steam supplied to the steam turbine is considerably elevated, the degree of superheating the turbine steam in a steam inlet of the steam turbine, especially a low pressure steam turbine, tend to be markedly increased. Thus, even if the degree of vacuum is substantially elevated in a steam outlet of the low pressure steam turbine, it becomes quite difficult that the turbine steam can reach a saturated temperature at the steam outlet of the low pressure steam turbine. In such a case, it also is difficult to keep the turbine steam in an adequately wet state. Therefore, a dried state and a wet state are alternately repeated (or a dry-wet cyclic state is generated), in a final stage blade of the low pressure steam turbine, leading to serious corrosion of the final stage blade.

In the thermal power plant, a feed-water heater is provided for heating, in advance, feed water which will be supplied to the boiler by using the turbine steam extracted from the steam turbine as heating source. As described above, when the temperature of the turbine steam is elevated up to, for example, approximately 700° C., the temperature of turbine steam (or extraction steam) extracted from the steam turbine and used as heat source for the feed-water heater is also elevated. Usually, however, for heating the feed water in the feed-water heater, latent heat of condensation of the extraction steam is mostly utilized, in order to keep the interior of the feed-water heater at substantially the same temperature and prevent the feed-water heater from deforming. Therefore, in the case of considerably elevating the temperature of the turbine steam, the degree of superheating the extraction steam tend to be excessively increased, causing the feed-water heater to be unduly deformed.

SUMMARY

The present invention was made in light of the above problems. That is to say, it is an object of this invention to provide a new carbon-dioxide-capture-type steam power generation system that can successfully restrain the power generation efficiency from lowering.

The present invention is a carbon-dioxide-capture-type steam power generation system, comprising: a boiler producing a steam and an exhaust gas by combusting a fuel, the boiler having a flue through which the exhaust gas passes so as to discharge from the boiler; an absorbing unit receiving the exhaust gas from the boiler, the absorbing unit being configured to absorb the carbon-dioxide contained in the exhaust gas into an absorbing solution; a regenerating unit receiving the absorbing solution containing the carbon dioxide from the absorbing unit, the regenerating unit being configured to release the carbon dioxide gas from the absorbing solution absorbing the carbon dioxide and discharge the released carbon dioxide gas from the regenerating unit; a reboiler receiving a heating-medium as heat source, the reboiler producing a steam by heating the absorbing solution supplied from the regenerating unit and supplying the produced steam to the regenerating unit; a boiler-side heat exchanger provided between a economizer of the boiler and an air preheater in a flue, the boiler-side heat exchanger heating the heating-medium by the exhaust gas passing therethrough.

According to this invention, the heating-medium heated by the exhaust gas passing through the flue of the boiler, is supplied to the boiler. The absorbing solution is heated in the reboiler by this heating-medium as heat source so as to produce regenerating steam, and then the produced regenerating steam is supplied to the regenerating unit. Namely, by utilizing heat of the exhaust gas discharged from the boiler as energy required for heating the absorbing solution in the reboiler, the carbon dioxide can be released, with high efficiency, from the absorbing solution absorbing the carbon dioxide in the regenerating unit. Therefore, lowering of power generation efficiency in the carbon-dioxide-capture-type steam power generation system can be successfully restrained.

DETAILED DESCRIPTION

First Embodiment

Hereinafter, one exemplary embodiment of the present invention will be described with reference to the drawings.

Figure 1:
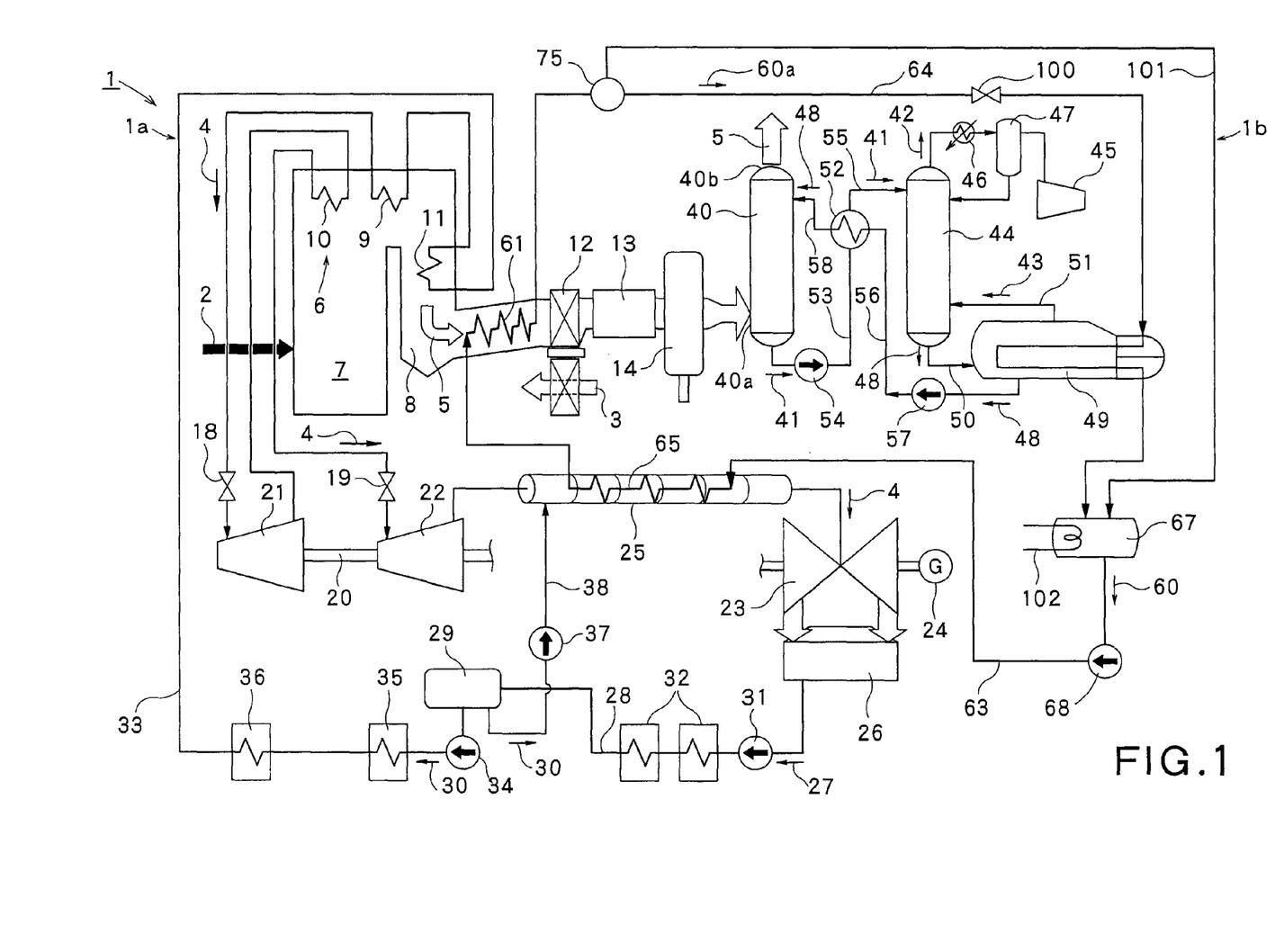
FIG. 1 is a diagram illustrating general construction of a carbon-dioxide-capture-type steam power generation system according to a first embodiment of the present invention.

First, the carbon-dioxide-capture-type steam power generation system 1 according to this invention will be described. As shown in FIG. 1, the carbon-dioxide-capture-type steam power generation system 1 includes a steam power generation plant 1a for producing turbine a steam 4 by combusting a fuel 2, so as to generate electric power by rotating a turbine, and a carbon dioxide capturing plant 1b for capturing the carbon dioxide by using an absorbing solution for absorbing the carbon dioxide contained in an exhaust gas 5 which is produced in a boiler 6.

The steam power generation plant 1a, as shown in FIG. 1, comprises the boiler 6 being configured to receive the fuel 2 and a combustion air 3 and produce the turbine steam 4 and the exhaust gas 5 by combusting the fuel 2 and the combustion air 3. This boiler 6 has a furnace 7 configured to combust the fuel 2 and the combustion air 3 respectively supplied therein, and a flue 8 provided on the downstream side of the furnace 7. The exhaust gas 5 produced in the furnace 7 can be passed through the flue 8, so as to discharge from the boiler 6. In the furnace 7, a superheater 9 is provided for superheating the turbine steam 4 by means of the combustion performed in the furnace 7, so as to produce a main steam. In addition, adjacent to the superheater 9 a reheater 10 is provided for reheating the turbine steam 4, so as to produce a reheated steam. In this case, the turbine steam 4 is supplied from the superheater 9 to the reheater 10, via a high pressure steam turbine 21 as described later. In addition, on the upstream side of the flue 8, a economizer 11 is provided for heating a feed water 30 (or a deaerated water-steam, which will be described below) which will be supplied to the superheater 9 thereafter, by utilizing the exhaust gas 5, as heat source, passing through the flue 8.

At an outlet of the flue 8 of the boiler 6, an air preheater 12 is provided for preheating the combustion air 3 which will be supplied to the furnace 7 of the boiler 6 thereafter. On the downstream side of the air preheater 12, a dust collector 13 is provided for removing dust from the exhaust gas 5 flowed from the air preheater 12. Further, on the downstream side of the dust collector 13, a desulfurizer 14 is provided for desulfurizing the exhaust gas 5 flowed from the dust collector 13.

The steam power generation plant 1a of the carbon-dioxide-capture-type steam power generation system 1 includes the high pressure steam turbine (or high pressure turbine) 21 configured to rotate by receiving the turbine steam 4 (or main steam) from the superheater 9 of the boiler 6 via a high-pressure valve 18, and a intermediate pressure steam turbine (or intermediate pressure turbine) 22 connecting to the high pressure turbine 21 via a turbine shaft 20, and configured to rotate by receiving the turbine steam 4 (or reheated steam) from the high pressure turbine 21 via the reheater 10 of the boiler 6 and a intermediate pressure valve 19. Further, a low pressure steam turbine (or low pressure turbine) 23 is connected to the intermediate pressure turbine 22 via the turbine shaft 20. The low pressure turbine 23 is configured to rotate by receiving the turbine steam 4 (or exhaust steam (or intermediate pressure exhaust steam)) from the intermediate pressure turbine 22. Additionally, a power generator 24 for generating electric power with rotation of the turbine shaft 20 is connected to the turbine shaft 20. It is noted that, in this embodiment, as described above, the single turbine shaft 20 is constructed by connecting the high pressure steam turbine 21, the intermediate pressure steam turbine 22, the low pressure steam turbine 23 and a rotating shaft of the power generator 24, in one line. However this embodiment is not limited to such an aspect. For instance, the steam power generation plant 1a may be composed of two or more turbine shafts, each connected with at least one steam turbine, with a plurality of power generators connected to each turbine shaft. Additionally, in this embodiment, only one reheater 10 is provided in the boiler 6. However, the reheater 10 may be provided in a two-stage construction including a first reheater producing a first reheated steam by reheating the exhaust steam of the high pressure steam turbine 21 and a second reheater producing second reheated steam. In this case, the steam power generation plant 1a is constructed as the so-called two-stage-reheating-type steam turbine plant, which includes two intermediate pressure steam turbines 22, such as a first intermediate pressure steam turbine receiving the first reheated steam, and a second intermediate pressure steam turbine receiving the second reheated steam produced by heating the exhaust steam from the first intermediate pressure turbine in the second reheater.

Between an outlet of the intermediate pressure turbine 22 and an inlet of the low pressure turbine 23, a crossover pipe 25 is provided for supplying the turbine steam 4 (or intermediate pressure exhaust steam) from the intermediate pressure turbine 22 to the low pressure turbine 23.

In a lower portion of the low pressure turbine 23, a condenser 26 is provided (installed) for producing a condensation 27 by cooling and condensing the turbine steam 4 (or exhaust steam (or low pressure exhaust steam) from the low pressure turbine 23) discharged from the low pressure turbine 23. To the condenser 26, a condensation line 28 is connected. This condensation line 28 is used as a piping system for introducing the condensation 27 discharged from the condenser 26 into a deaerator 29 which is configured to produce the deaerated water-steam (or feed water) 30 by deaerating the condensation 27. In the condensation line 28, a condensate pump 31 is provided for supplying the condensation 27 passing through the condensation line 28 to the deaerator 29. On the downstream side (or on the side of the deaerator 29) of the condensate pump 31, two-stage low pressure feed water heaters 32 are provided in series. Each low pressure feed water heater 32 is configured to heat the condensation 27, by utilizing the turbine steam 4 (or low pressure extraction steam), as heat source, extracted from the low pressure turbine 23.

Between the deaerator 29 and the economizer 11 of the boiler 6, a feed water line 33 for supplying the feed water (or deaerated water-steam) 30 to the boiler 6 is connected. In the feed water line 33, a feed water pump 34 is provided for supplying the feed water 30 passing through the feed water line 33, to the economizer 11 of the boiler 6. On the downstream side (or on the side of the economizer 11) of the feed water pump 34, a first high pressure feed water heater 35 is provided for heating the deaerated water-steam 30, by utilizing the turbine steam 4 (or intermediate pressure extraction steam), as heat source, extracted from the intermediate pressure turbine 22. Further, on the downstream side of the first high pressure feed water heater 35, a second high pressure feed water heater 36 is provided for further heating the deaerated water-steam 30, by utilizing the turbine steam 4 (or high pressure extraction steam), as heat source, extracted from the high pressure turbine 21. It is noted that, in this embodiment, as described above, the low pressure feed water heaters 32 are provided, in the two-stage construction, in the condensation line 28, while the first high pressure feed water heater 35 and second high pressure feed water heater 36 are connected, in series, in the feed water line 33, thus providing the two-stage construction of the high pressure feed water heaters. However, the number of stages of the low pressure feed water heaters 32 and/or high pressure feed water heaters may be altered, suitably, without any limitation.

A deaerated water-steam pump 37 is connected to the deaerator 29. This deaerated water-steam pump 37 is configured to take out a part of the deaerated water-steam 30 produced by the deaerator 29 and then supply the part of the deaerated water-steam 30 to a deaerated water-steam supply line 38 as described later. On the downstream side of the deaerated water-steam pump 37, the deaerated water-steam supply line 38 is provided for directing the part of the deaerated water-steam 30 taken out by the deaerated water-steam pump 37, toward the turbine steam 4 which is supplied from the medium turbine 22 to the low pressure turbine 23. More specifically, as shown in FIG. 1, the deaerated water-steam supply line 38 is connected between the deaerated water-steam pump 37 and the crossover pipe 25, and is configured to direct the part of the deaerated water-steam 30 taken out by the deaerated water-steam pump 37, toward the crossover pipe 25. It is noted that between the deaerator 29 and the condenser 26 a deaerated water-steam steam supply line (not shown) is connected, for returning steam of the deaerated water-steam (or deaerated steam) produced by the deaerator 29 to the condenser 26.

Next, the carbon dioxide capturing plant 1b of the carbon-dioxide-capture-type steam power generation plant 1 will be described.

As shown in FIG. 1, the carbon dioxide capturing plant 1b includes an absorbing unit 40 being configured to receive the exhaust gas from the boiler, in which the carbon dioxide contained in the exhaust gas 5 is absorbed into a carbon-dioxide absorbing solution, and a regenerating unit (regenerator) 44 being configured to receive the absorbing solution containing the carbon dioxide (hereinafter, referred to as "the carbon-dioxide-containing rich absorbing solution 41") from the absorbing unit, in which the carbon dioxide gas 42 is released from the carbon-dioxide-containing rich absorbing solution 41. Then, the carbon dioxide gas containing steam (hereinafter, referred to as "the steam-containing carbon dioxide gas 42") is discharged from the regenerating unit 44, while the carbon-dioxide-containing rich absorbing solution 41 is regenerated.

An exhaust gas inlet port 40a is disposed in a lower portion of the absorbing unit 40, while an exhaust gas outlet port 40b is disposed in a top of the absorbing unit 40. In this case, the exhaust inlet port 40a is configured to receive the exhaust gas 5 discharged from the boiler 6 into the absorbing unit 40, via the air preheater 12, the dust collector 13 and the desulfurizer 14, in succession. The exhaust gas outlet port 40b is configured to discharge the exhaust gas 5, from which the carbon dioxide is removed in the absorbing unit 40, from the absorbing unit 40.

The absorbing solution used for absorbing the carbon dioxide comprises an aqueous amine compound solution prepared by dissolving an amine compound (or compounds) in water. In this embodiment, the amine compound is not limited to a certain kind of amine compounds. Namely, various kinds of amine compounds may be used.

To the regenerating unit 44, a compressor 45 configured to compress the steam-containing carbon dioxide gas 42 discharged from a top of the regenerating unit 44, is connected. Between the regenerating unit 44 and the compressor 45, a water separating gas cooler 46 is provided for cooling the steam-containing carbon dioxide gas 42 discharged from the regenerating unit 44. On the side of the compressor 45 relative to the water separating gas cooler 46, a separator 47 is connected. This separator 47 is configured to condense the steam from the steam-containing carbon dioxide gas 42 that has been cooled by the water separating gas cooler 46, into water and separate. Further, a desired equipment (not shown) is connected to the compressor 45 for compressing and storing the steam-containing carbon dioxide gas 42 compressed by the compressor 45 therein.

In the carbon dioxide capturing plant 1b, a reboiler 49 is provided for heating a regenerated lean absorbing solution 48 supplied from a lower portion of the regenerating unit 44 in which the carbon dioxide is released therefrom, thereby to produce high temperature steam. The high temperature steam produced by the reboiler 49 is then supplied, as a regenerating steam 43, to the regenerating unit 44. Between the reboiler 49 and the regenerating unit 44, a regenerated lean absorbing solution discharging line 50 is connected for discharging a part of the heated regenerated lean absorbing solution 48. Specifically, the regenerated lean absorbing solution discharging line 50 is connected to a bottom portion of the regenerating unit 44, such that the regenerated lean absorbing solution 48 flowed downward to the bottom portion of the regenerating unit 44 can be taken out through this line 50. Meanwhile, the regenerating steam 43 is supplied from the reboiler 49 to the regenerating unit 44, via a regenerating steam supply line 51 provided therebetween. This regenerating steam supply line 51 is connected to a lower portion of the regenerating unit 44.

Between the absorbing unit 40 and the regenerating unit 44, a lean/rich heat exchanger 52 is provided for heating the-carbon-dioxide-containing rich absorbing solution 41 supplied from the absorbing unit 40 to the regenerating unit 44. Further, a first carbon-dioxide-containing rich absorbing solution supply line 53, for supplying the carbon-dioxide-containing rich solution 41 from the absorbing unit 40 to the lean/rich heat exchanger 52, is connected therebetween. A rich absorbing-solution circulation pump 54 is provided in the line 53. In addition, a second carbon-dioxide-containing rich absorbing solution supply line 55, for supplying the carbon-dioxide-containing rich solution 41 from the lean/rich heat exchanger 52 to the regenerating unit 44, is connected therebetween. More specifically, the first carbon-dioxide-containing rich absorbing solution supply line 53 is connected to a bottom portion of the absorbing unit 40, such that the carbon-dioxide-containing rich absorbing solution 41 flowed downward to the bottom portion of the absorbing unit 40 can be taken out through this supply line 53, while the second carbon-dioxide-containing rich absorbing solution supply line 55 is connected to an upper portion of the regenerating unit 44, such that the carbon-dioxide-containing rich absorbing solution 41 can be supplied to the upper portion of the regenerating unit 44 through this supply line 55.

A first regenerated lean absorbing solution supply line 56, for supplying the regenerated lean absorbing solution 48 from the reboiler 49 to the lean/rich heat exchanger 52, is connected therebetween. A regenerated lean absorbing solution circulation pump 57 is provided in the line 56. In addition, a second regenerated lean absorbing solution supply line 58, for supplying the regenerated lean absorbing solution 48 from the lean/rich heat exchanger 52 to the absorbing unit 40, is connected therebetween. The second regenerated lean absorbing solution supply line 58 is connected to an upper portion of the absorbing unit 40, such that the regenerated lean absorbing solution 48 can be supplied to the upper portion of the absorbing unit 40 through this supply line 58. In this manner, both of the carbon-dioxide-containing rich absorbing solution 41 having a relatively low temperature, which is supplied from the absorbing unit 40 and the regenerated lean absorbing solution 48 having a relatively high temperature, which is supplied from the reboiler 49, are respectively supplied to the lean/rich heat exchanger 52, Thus heat exchange is conducted between the two absorbing solutions 41 and 48. Namely, the heat exchanger 52 serves to heat the carbon-dioxide-containing rich absorbing solution 41 supplied from the absorbing unit 40, by utilizing the regenerated lean absorbing solution 48, as heat source, supplied from the reboiler 49.

Next, construction for supplying a heating-medium, which is used as heat source for heating the regenerating steam 43, to the reboiler 49 will be discussed.

As shown in FIG. 1, a boiler-side heat exchanger 61 is provided in the flue 8 of the boiler 6. This boiler-side heat exchanger 61 is configured to produce a saturated heating-steam 60a or saturated heating-water 60 (or heating-medium)

by heating a heating-water 60 (or heating-medium) with the exhaust gas 5, as heat source, passing through the flue 8 of the boiler 6. Then, the heating-steam 60a is supplied to the reboiler 49, in order to produce the regenerating steam 43 in the reboiler 49. More specifically, the boiler-side heat exchanger 61 is provided between the economizer 11 and the air preheater 12 in the flue 8 of the boiler 6. In the boiler-side heat exchanger 61, all of the heating-water 60 is not changed into the steam, while the saturated heating-steam 60a containing some amount of moisture (or the saturated heating-water 60) is produced. Between the reboiler 49 and the boiler-side heat exchanger 61, a first heating-medium supply line 63 (or heating-medium supply line) for supplying the heating-water 60 from the reboiler 49 to the boiler-side heat exchanger 61 and a second heating-medium supply line 64 for supplying the heating-steam 60a produced in the boiler-side heat exchanger 61, from the boiler-side heat exchanger 61 to the reboiler 49, are provided respectively. As well, in the second heating-medium supply line 64, a steam-water separation header 75 for the heating-medium is provided for separating the saturated heating-steam 60a containing a bit moisture (or the heating-water 60 in water-steam state), into steam and water. A pressure reducing valve 100 for reducing the pressure of the heating-steam 60a is provided between the steam-water separation header 75 for the heating-medium and the reboiler 49. Additionally, between the steam-water separation header 75 for the heating-medium and a tank 67 as described later, a water returning line 101 for the heating-medium is provided for returning the water removed in the steam-water separation header 75 for the heating-medium to the tank 67.

In the crossover pipe 25 located between the intermediate pressure turbine 22 and the low pressure turbine 23, a turbine-side heat exchanger 65 is provided. The turbine-side heat exchanger 65 is configured to heat the heating-water 60 that will be supplied to the boiler-side heat exchanger 61 thereafter, by utilizing the turbine steam 4 (i.e., the intermediate pressure exhaust steam or low pressure steam), as heat source, passing through the crossover pipe 25. This turbine-side heat exchanger 65 is provided in the first heating-medium supply line 63. Namely, the turbine-side heat exchanger 65 is located between the reboiler 49 and the boiler-side heat exchanger 61. It is contemplated that the turbine-side heat exchanger 65 may be provided, not only in the interior of the crossover pipe 25, but also along the inner circumference of the crossover pipe 25 or in a vessel wall thereof.

The tank 67 for storing the heating-water 60 therein is provided in the first heating-medium supply line 63, and a heating-water circulation pump 68 for supplying the heating-water 60 to the turbine-side heat exchanger 65 is provided between the tank 67 and the turbine-side heat exchanger 65. Further, a heating-medium cooler 102 is provided in the tank 67. The heating-medium cooler 102 configured to cool and condense the steam present in the tank 67 as well as to cool the heating-water 60 stored in the tank 67.

With this configuration, the heating-water 60 heated by the turbine-side heat exchanger 65 can be supplied to the boiler-side heat exchanger 61. The heating-water 60 is further heated in the boiler-side heat exchanger 61, and thus the saturated heating-steam 60a containing the moisture can be produced. The water is removed from the heating-water 60 in water-steam state by the steam-water separation header 75 for the heating-medium, and the resultant heating-steam 60a is supplied to the reboiler 49. Thus, the reboiler 49 can produce the regenerating steam 43, by utilizing such resultant heating-steam 60a, as heat source.

Next, the operation of this embodiment constructed as above will be described.

First, the operation of the steam power generation plant 1a of the carbon-dioxide-capture-type steam power generation system 1 will be described.

In the case of generating the electric power in the steam power generation plant 1a shown in FIG. 1, the combustion air 3 preheated by the air preheater 12 is supplied to the furnace 7, together with the fuel 2, so that the fuel 2 can be combusted in the furnace 7. With the combustion of the fuel 2, the feed water (or deaerated water-steam) 30 supplied from the economizer 11 is superheated in the superheater 9 provided above the furnace 7. Thus, the turbine steam 4 can be produced as the main steam.

The turbine steam 4 (or main steam) is supplied from the preheater 9 to the high pressure turbine 21, via the high-pressure valve 18, so as to work while being expanded and passing through the high pressure turbine 21. As a result, the high pressure turbine 21 can be rotated. After the turbine steam 4 (or high pressure exhaust steam) is discharged from the high pressure turbine 21, this steam 4 is supplied to the reheater 10 of the boiler 6. In the reheater 10, the turbine steam 4 is reheated into the reheated steam.

The reheated turbine steam 4 (or reheated steam) is supplied from the reheater 10 to the intermediate pressure turbine 22, via the intermediate pressure valve 19, so as to work while being expanded and passing through the intermediate pressure turbine 22. As a result, the intermediate pressure turbine 22 can be rotated.

The turbine steam 4 (or intermediate pressure exhaust steam) discharged from the intermediate pressure turbine 22 is 20 supplied from the outlet of the intermediate pressure turbine 22, through the crossover pipe 25, to the low pressure turbine 23. In the low pressure turbine 23, the turbine steam 4 works again while being further expanded and passed therethrough. As a result, the low pressure turbine 23 can be rotated.

In this way, the high pressure turbine 21, intermediate pressure turbine 22 and low pressure turbine 23 are rotated, respectively, so that the power generator 24 connected to the turbine shaft 20 can generate the electric power.

The turbine steam 4 (or low pressure exhaust steam) that has worked in the low pressure turbine 23 is discharged from an outlet of the low pressure turbine 23 to the condenser 26. Thus, in the condenser 26, the turbine steam 4 is cooled and condensed into the condensation 27. The condensation 27 is successively supplied to the two-stage low pressure feed water heaters 32 by the condensate pump 31 of the condensation line 28. During this period, the turbine steam 4 (or low pressure extraction steam) is also extracted from the low pressure turbine 23 and supplied to the two-stage low pressure feed water heaters 32 respectively. In this way, the condensation 27 can be heated, by utilizing the turbine steam 4 (or low pressure extraction steam) extracted from the low pressure turbine 23, as heat source.

The heated condensation 27 is supplied to the deaerator 29 and deaerated. Thus, the deaerated water-steam (or feed water) 30 can be produced. At this time, deaerated steam is also produced from the condensation 27 in the deaerator 29. However, such deaerated steam is returned to the condenser 26, via a deaerated steam supply line (not shown).

The deaerated water-steam 30 produced in the deaerator 29 is used as the feed water 30. This feed water 30 is supplied to the first high pressure feed water heater 35 by the feed water pump 34 of the feed water line 33. In this case, the pressure of the feed water 30 is elevated higher than a supercritical pressure by the feed water pump 34.

Meanwhile, a part of the deaerated water-steam 30 produced in the deaerator 29 is taken out by the deaerated water-steam pump 37, and such deaerated water-steam 30 is supplied toward an inlet of the crossover pipe 25, via the deaerated water-steam supply line 38.

While the feed water 30 is supplied to the first high pressure feed water heater 35, the part of turbine steam 4 (or intermediate pressure extraction steam) is extracted from the intermediate pressure turbine 22 and supplied to the first high pressure feed water heater 35. In this way, the feed water 30 can be heated by utilizing the turbine steam 4 (or intermediate pressure extraction steam), as heat source, extracted from the intermediate pressure turbine 22. The heated feed water 30 is supplied to the second high pressure feed water heater 36. During this period, the part of turbine steam 4 (or high pressure extraction steam) is extracted from the high pressure turbine 21 and supplied to the second high pressure feed water heater 36. As a result, the feed water 30 can be further heated by utilizing the turbine steam 4 (or high pressure extraction steam), as heat source, extracted from the high pressure turbine 21.

After heated through the above first high pressure feed water heater 35 and second high pressure feed water heater 36, the feed water 30 is supplied to the economizer 11 of the boiler 6, and is further heated by utilizing the exhaust gas 5, as heat source, passing through the flue 8. The feed water 30 further heated in the economizer 11 is supplied to the superheater 9, where it is superheated into the turbine steam 4 (or main steam).

While the furnace 7 of the boiler 6 continues the combustion, the exhaust gas 5 produced in the furnace 7 is discharged through the flue 8 provided on the downstream side of the furnace 7. The exhaust gas 5 discharged from the boiler 6 is supplied to the air preheater 12 and used for preheating the combustion air 3 that will be supplied to the furnace 7 thereafter. After used for preheating the combustion air 3, the exhaust gas 5 is supplied to the dust collector 13, where the dust contained in the exhaust gas 5 is removed therefrom. Thereafter, the exhaust gas 5 is supplied to the desulfurizer 14, so as to be desulfurized therein.

Next, the operation of the carbon dioxide capturing plant 1b of the carbon-dioxide-capture-type steam power generation plant 1 will be discussed.

In the case in which the carbon dioxide is captured from the exhaust gas 5 in the carbon dioxide capturing plant 1b shown in FIG. 1, the exhaust gas 5 that has been desulfurized by the desulfurizer 14 as described above is supplied into the absorbing unit 40 through the exhaust gas inlet port 40a thereof. The exhaust gas 5 containing the carbon dioxide and supplied into the absorbing unit 40 is flowed upward from the bottom portion of the absorbing unit 40 toward the top thereof. During this period, the regenerated lean absorbing solution 48 is supplied to the upper portion of the absorbing unit 40, via the lean/rich heat exchanger 52 and the second regenerated lean absorbing solution supply line 58, and flowed downward from the upper portion of the absorbing unit 40 toward the bottom portion thereof. As a result, the exhaust gas 5 containing the carbon dioxide and the regenerated lean absorbing solution 48 can be brought into countercurrent contact with each other, thereby the carbon dioxide contained in the exhaust gas 5 can be absorbed in the regenerated lean absorbing solution 48.

After the carbon dioxide is removed from the exhaust gas 5, the exhaust gas 5 is further flowed upward to the top of the absorbing unit 40, and is discharged from the exhaust gas outlet port 40b of the absorbing unit 40. Meanwhile, the carbon-dioxide-containing rich absorbing solution 41 is further flowed downward to the bottom portion of the absorbing unit 40.

The carbon-dioxide-containing rich absorbing solution 41 flowed downward is supplied from the absorbing unit 40 to the lean/rich heat exchanger 52, through the first carbon-dioxide-containing rich absorbing solution supply line 53, by the rich absorbing-solution circulation pump 54. Meanwhile, the absorbing solution (or regenerated lean absorbing solution 48) regenerated in the regenerating unit 44 is also supplied from the reboiler 49 to the lean/rich heat exchanger 52, through the first regenerated lean absorbing solution supply line 56, by the regenerated lean absorbing solution circulation pump 57. As a result, the carbon-dioxide-containing rich absorbing solution 41 can be heated by utilizing the regenerated lean absorbing solution 48, as heat source, in the lean/rich heat exchanger 52.

The heated carbon-dioxide-containing rich absorbing solution 41 is supplied from the lean/rich heat exchanger 52 to the upper portion of the regenerating unit 44, through the second carbon-dioxide-containing rich absorbing solution line 55, and is flowed downward from the upper portion of the regenerating unit 44 toward the bottom portion thereof. During this period, the high temperature regenerating steam 43 is supplied from the reboiler 49 to the lower portion of the regenerating unit 44, through the regenerating steam supply line 51, and is flowed upward from the lower portion of the regenerating unit 44 toward the top thereof. In this way, the carbon-dioxide-containing rich absorbing solution 41 and regenerating steam 43 can be brought into countercurrent contact with each other, thereby the carbon dioxide gas can be released from the carbon-dioxide-containing rich absorbing solution 41.

As is generally known, the concentration of the carbon dioxide contained in the absorbing solution is reduced, as the temperature of the absorbing solution is elevated. Namely, by elevating the temperature of the absorbing solution absorbing the carbon dioxide, the carbon dioxide gas can be released, more efficiently, from the absorbing solution. Therefore, the temperature of the carbon-dioxide-containing rich absorbing solution 41 is elevated with the high temperature regenerating steam 43 supplied from the reboiler 49. Thus, the carbon dioxide gas can be released, more efficiently, from the carbon-dioxide-containing rich absorbing solution 41.

The released carbon dioxide gas is further flowed upward toward the top of the regenerating unit 44, together with the steam, and discharged from the top of the regenerating unit 44, as the carbon dioxide gas containing the steam (or steam-containing carbon dioxide gas 42). Meanwhile, the absorbing solution (or regenerated lean absorbing solution 48) regenerated with the release of the carbon dioxide gas therefrom, is further flowed downward toward the bottom portion of the regenerating unit 44.

Thereafter, the steam-containing carbon dioxide gas 42 is supplied from the upper portion of the regenerating unit 44 to the compressor 45. During this period, a part of the steam contained in the steam-containing carbon dioxide gas 42 is cooled and condensed by the water separating gas cooler 46. The part of the steam contained in the cooled steam-containing carbon dioxide gas 42 is condensed into water and separated in the separator 47. The steam-containing carbon dioxide gas 42, from which the part of the steam has been separated, is supplied to the compressor 45. It is noted that the condensed water separated in the separator 47 is returned to the upper portion of the regenerating unit 44.

In the compressor 45, the steam-containing carbon dioxide gas 42 is compressed, and is supplied to the desired equipment (not shown) for compressing and storing the carbon dioxide gas therein.

Meanwhile, as shown in FIG. 1, the regenerated lean absorbing solution 48 regenerated in the regenerating unit 44 is supplied from the regenerating unit 44 to the reboiler 49. During this period, the saturated heating-steam 60a heated and produced by the boiler-side heat exchanger 61 as described later, is separated into steam and water by the steam-water separation header 75 for the heating-medium, and is supplied to the reboiler 49, via the pressure reducing valve 100. As a result, the regenerated lean absorbing solution 48 can be heated by utilizing the heating-steam 60a as heat source. Thus, the high temperature regenerating steam 43 can be produced from fraction of water contained in the regenerated lean absorbing solution 48. In addition, since the pressure of the heating-steam 60a which will be supplied to the reboiler 49 thereafter, is reduced, in advance, by the pressure reducing valve 100, the degree of superheating the steam can be increased slightly. Thus, the condensation of the heating-steam 60a can be successfully prevented.

Then, the high temperature regenerating steam 43 is supplied from the reboiler 49 to the regenerating unit 44, through the regenerating steam supply line 51. Meanwhile, the regenerated lean absorbing solution 48 heated by the reboiler 49 is supplied from the reboiler 49 to the lean/rich heat exchanger 52, as described above, through the first regenerated lean absorbing solution supply line 56, by the regenerated lean absorbing solution circulation pump 57.

As described above, in the lean/rich heat exchanger 52, the carbon-dioxide-containing rich absorbing solution 41 supplied from the absorbing unit 41 is heated, by utilizing the regenerated lean absorbing solution 48 supplied from the reboiler 49 or regenerating unit 44, as heat source. Meanwhile, the regenerated lean absorbing solution 48 used as heat source is in turn cooled in the lean/rich heat exchanger 52, and is then supplied to the upper portion of the absorbing unit 40, through the second regenerated lean absorbing solution supply line 58.

Next, the operation for supplying the heating-steam 60a to the reboiler 49 will be described.

As shown in FIG. 1, the heating-steam 60a used for producing the regenerating steam 43 in the reboiler 49 is cooled into the heating-water 60 and then discharged from the reboiler 49 into the tank 67 provided in the first heating-medium supply line 63. In this case, the heating-water 60 discharged and stored in the tank 67 is cooled by the heating-medium cooler 102. At this time, the steam present in the tank 67 is also cooled and condensed.

The cooled heating-water 60 is supplied from the tank 67 to the turbine-side heat exchanger 65, by the heating-water circulation pump 68. In the turbine-side heat exchanger 65, the heating-water 60 is heated, by utilizing the turbine steam 4 (or intermediate pressure exhaust steam or low pressure steam), as heat source, passing through the crossover pipe 25.

The heating-water 60 heated by the turbine-side heat exchanger 65 is supplied to the boiler-side heat exchanger 61. In the boiler-side heat exchanger 61, the heating-water 60 is further heated, by utilizing the exhaust gas 5, as heat source, passing between the economizer 11 and the air preheater 12 in the flue 8 of the boiler 6, so that the heating-steam 60a containing some amount of moisture (the saturated heating-water 60) can be produced in a saturated state.

The heating-steam 60a is supplied to the reboiler 49, via the pressure reducing valve 100, through the second heating-medium supply line 64. At this time, in the steam-water separation header 75 for the heating-medium, the heating-water 60 in water-steam state is separated into steam and water, and thus the water is removed from the heating-water 60 in water-steam state. Consequently, the heating-steam 60a can be supplied into the reboiler 49, while the water removed therefrom. Then, the heating-steam 60a is used, as heat source, for producing the regenerating steam 43 in the reboiler 49. In this case, the latent heat of the heating-steam 60a is utilized as heat source for producing the regenerating steam 43. Therefore, the regenerating steam 43 can be produced more efficiently, as compared with the case of using the heating-steam 60a containing the moisture. As described above, the water removed by the steam-water separation header 75 for the heating-medium is returned into the tank 67, through the water returning line 101 for the heating-medium, without being supplied to the reboiler 49.

Thus, according to this embodiment, the heating-water 60 is heated, in the turbine-side heat exchanger 65, by utilizing the turbine steam 4, as heat source, passing through the crossover pipe 25, and further heated, in the boiler-side heat exchanger 61, by utilizing the exhaust gas 5, as heat source, passing through the flue 8 of the boiler 6, so that the saturated heating-steam 60a containing some amount of moisture (or the saturated heating-water 60) can be produced. The water is removed from the water-steam state of heating-water 60 by the steam-water separation header 75 for the heating-medium, and the resultant heating-steam 60a is dried by the pressure reducing valve 100 and is supplied to the reboiler 49. Consequently, the high temperature regenerating steam 43 can be produced in the reboiler 49, with high efficiency, by utilizing such heating-steam 60a, as heat source. The high temperature regenerating steam 43 is supplied to the regenerating unit 44, and thus the carbon dioxide gas can be released, with high efficiency, from the carbon-dioxide-containing rich absorbing solution 41 in the regenerating unit 44. In this case, as heat source for heating the heating-steam 60a that will be further utilized thereafter as heat source for producing the regenerating steam 43, the exhaust gas 5 passing through the flue 8 and the turbine steam 4 passing through the crossover pipe 25 are utilized. Namely, the energy required for releasing the carbon dioxide gas from the carbon-dioxide-containing rich absorbing solution 41 can be taken out from the exhaust gas 5 discharged from the boiler 6. In addition, the extracted turbine steam 4 is not directly used as heat source for heating the regenerating steam 43. Instead, the turbine steam 4 passing through the crossover pipe 25 is indirectly utilized as heat source. Therefore, deterioration of the power generation efficiency can be successfully avoided.

In addition, according to this embodiment, the part of the deaerated water-steam 30 produced by the deaerator 29 is taken out by the deaerated water-steam pump 37 and supplied to the crossover pipe 25, via the deaerated water-steam supply line 38. In this way, the humidity of the turbine steam 4 (or intermediate pressure exhaust steam or low pressure steam) in the crossover pipe 25 can be suitably elevated, thereby always keeping the turbine steam 4 in an adequately wet state, in the outlet of the low pressure turbine 23 provided on the downstream side of the crossover pipe 25. This can positively prevent corrosion of a final stage blade (not shown) of the low pressure turbine 23. Usually, in the case of elevating the temperature of the turbine steam 4, especially the main steam and/or reheated steam thereof, up to 700° C. or so, a very dried state and a very wet state may tend to be seen, while being alternately repeated, in the turbine steam 4 (low pressure exhaust steam) in the outlet of the low pressure turbine 23. However, even in such a case, the turbine steam 4 of this embodiment can be securely kept in the adequately wet state in the outlet of the low pressure turbine 23.

In the above embodiment, as shown in FIG. 1, one end of the deaerated water-steam supply line 38 is connected to the deaerated water-steam pump 37, while the other end of the deaerated water-steam supply line 38 is connected to the crossover pipe 25. However, this invention is not limited to such an aspect. For instance, the other end of the deaerated water-steam supply line 38 may be connected to the outlet of the intermediate pressure turbine 22, such that the deaerated water-steam 30, after taking out by the deaerated water-steam pump 37, can be supplied to the outlet of the medium turbine 22. Also in this case, the turbine steam 4 can be always kept in the wet state in the outlet of the low pressure turbine 23.

In addition, in this embodiment, the turbine-side heat exchanger 65, for heating the heating-water 60 that will be supplied to the boiler-side heat exchanger 61 thereafter, is provided in the crossover pipe 25, in the first heating-medium supply line 63. In this case, the heating-water 60 is heated, by utilizing the turbine steam 4 (or intermediate pressure exhaust steam or low pressure steam), as heat source, passing through the crossover pipe 25. However, the present invention is not limited to this aspect. For instance, the heating-water circulation pump 68 in the first heating-medium supply line 63 may be directly connected to an inlet of the boiler-side heat exchanger 61, without providing the turbine-side heat exchanger 65 in the first heating-medium supply line 63. Also in this case, the energy required for releasing the carbon dioxide gas from the carbon-dioxide-containing rich absorbing solution 41 can be adequately taken out from the exhaust gas 5 discharged from the boiler 6, thereby successfully restraining the deterioration of the power generation efficiency as well as effectively capturing the carbon dioxide from the exhaust gas 5.

Second Embodiment

Next, referring to FIG. 2, the carbon-dioxide-capture-type steam power generation system according to a second embodiment of the present invention will be described.

Figure 2:
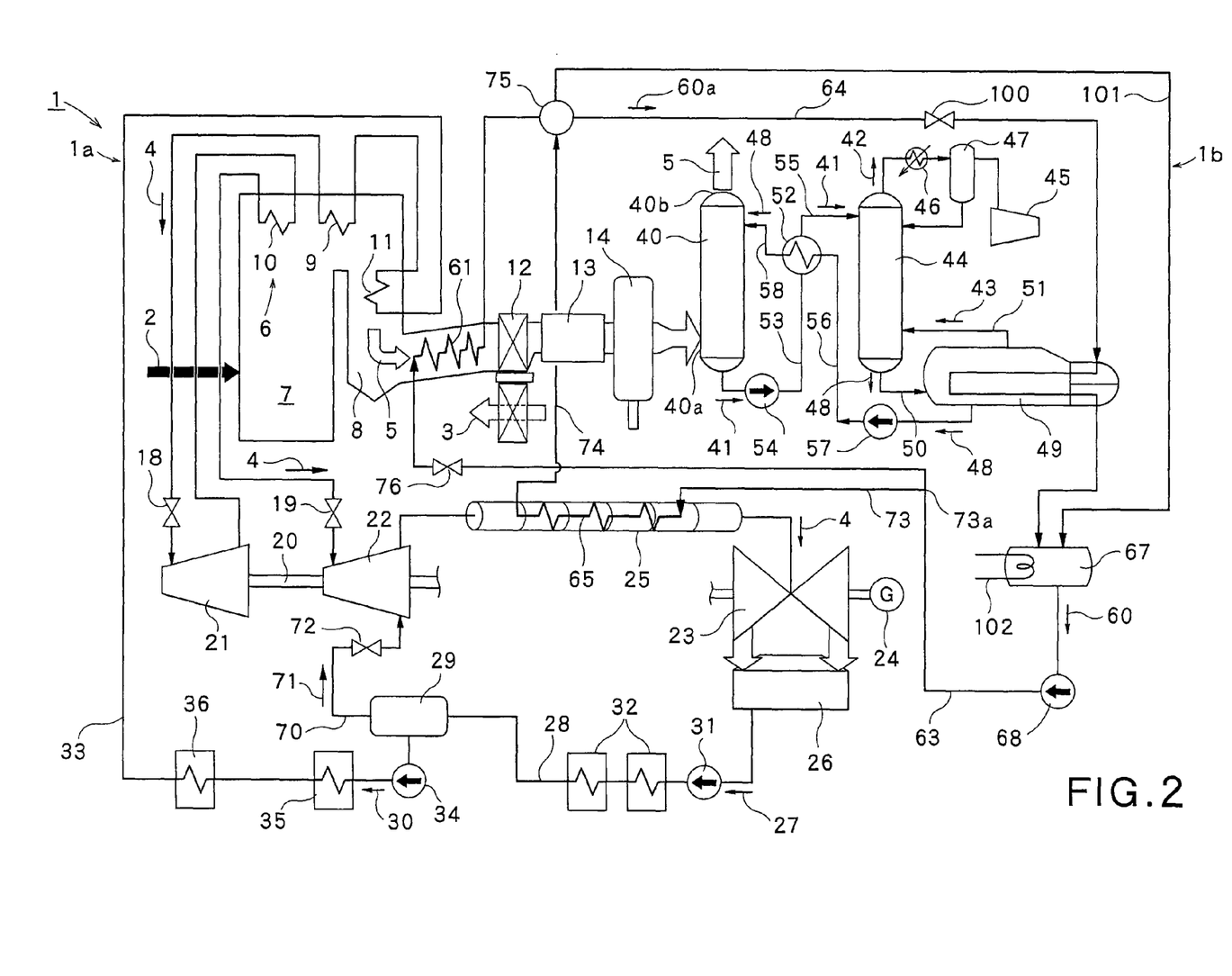
FIG. 2 is a diagram illustrating general construction of the carbon-dioxide-capture-type steam power generation system according to a second embodiment of the present invention.

The second embodiment shown in FIG. 2 is different from the first embodiment shown in FIG. 1, mainly in that the turbine-side heat exchanger is arranged in parallel with the boiler-side heat exchanger, and the deaerated steam produced by deaerating the condensed water in the deaerator is supplied to the outlet of the intermediate pressure turbine. In regard to the other construction, however, the second embodiment is substantially the same as the first embodiment. It is noted that like parts depicted in FIG. 2 are respectively designated by like reference numerals respectively assigned to those depicted in FIG. 1, and such parts will not be further described below.

In the carbon-dioxide-capture-type steam power generation system 1 shown in FIG. 2, a deaerated steam supply line 70 is connected to the deaerator 29. This deaerated steam supply line 70 is configured to take out deaerated steam 71 produced by deaerating the condensation 27 in the deaerator 29 and then direct the deaerated steam 71 toward the turbine steam 4 supplied from the intermediate pressure turbine 23 to the low pressure turbine 23. More specifically, as shown in FIG. 2, the deaerated steam supply line 70 is provided between the deaerator 29 and the outlet of the intermediate pressure turbine 22 and configured to direct the deaerated steam 71 toward the outlet of the intermediate pressure turbine 22. In this case, a deaerated steam control valve 72 for controlling the pressure of the deaerated steam 71 passing through the deaerated steam supply line 70 is provided in the deaerated steam supply line 70.

The turbine-side heat exchanger 65, for heating the heating-water 60 for supplying to the reboiler 49, is provided in the crossover pipe 25 located between the intermediate pressure turbine 22 and the low pressure turbine 23. Again, the heating-water 60 is heated, by utilizing the turbine steam 4 (or intermediate pressure exhaust steam or low pressure steam), as heat source, passing through the crossover pipe 25. In this case, however, the turbine-side heat exchanger 65 is arranged between the first heating-medium supply line 63 and an outlet of the boiler-side heat exchanger 61. Namely, while the turbine-side heat exchanger 65 in the first embodiment is connected, in series, with the boiler-side heat exchanger 61, in this embodiment the turbine-side heat exchanger 65 and the boiler-side heat exchanger 61 is connected in parallel to each other. Thus, the heating-water 60 is heated by the turbine-side heat exchanger 65, while the saturated heating-water 60 is produced by heating the heating-water 60 in the boiler-side heat exchanger 61. The heated heating-water 60 and the saturated heating-water 60 are flowed into each other and separated into steam and water. Thereafter, the resultantly separated steam is supplied to the reboiler 49.

Namely, as shown in FIG. 2, an inlet of the turbine-side heat exchanger 65 is connected with the first heating-medium supply line 63, via a first turbine-side heating-medium supply line 73 branched from the first heating-medium supply line 63. Meanwhile, in the second heating-medium supply line 64, the steam-water separation header 75 for the heating-medium is provided for separating the heating-water 60 in water-steam state into steam and water. In addition, an outlet of the turbine-side heat exchanger 65 is connected with the steam-water separation header 75 for the heating-medium, via a second turbine-side heating-medium supply line 74. With such configuration, the heating-water 60 heated by the turbine-side heat exchanger 65 is flowed into the steam water separation header 75 for the heating-medium, together with the saturated heating-water 60 supplied from the boiler-side heat exchanger 61. Thus, the heating-water 60 and the saturated heating-water 60 are mixed, and the mixture of the heating-water 60 and the saturated heating-water 60 is separated into the steam and water in the steam-water separation header 75 for the heating-medium. In this manner, the water can be removed from the heating-water 60 in water-steam state, and the resultant heating-steam 60a can be supplied to the reboiler 49, via the pressure reducing valve 100. Consequently, the regenerating steam 43 can be produced, with high efficiency, by utilizing the latent heat of the saturated heating-steam 60a, as heat source for producing the regenerating steam 43. Meanwhile, the water removed by the steam-water separation header 75 for the heating-medium is returned to the tank 67, through the water returning line 101 for the heating-medium, without being supplied into the reboiler 49.

A heating-water control valve 76 is provided on the downstream side of a branch position 73a, at which the first turbine-side heating-medium supply line 73 is branched from the first heating-medium supply line 63. The heating control valve 76 is configured to control pressure and flow rate of the heating-water 60 passing therethrough.

In this embodiment, the deaerated steam 71 produced by the deaerator 29 is supplied to the outlet of the intermediate pressure turbine 22. This can prevent water droplets from entering the low pressure turbine 23, via the outlet of the intermediate pressure turbine 22.

In addition, in this embodiment, the deaerated steam 71 supplied to the outlet of the intermediate pressure turbine 22 is produced by deaerating the condensation 27 that has been supplied to the deaerator 29. Therefore, the produced deaerated steam 71 is in a substantially saturated state with some humidity. Accordingly, the turbine steam 4 can be always kept in the adequately wet state at the outlet of the low pressure turbine 23, while the degree of superheating the steam at the inlet of the low pressure turbine 23 can be properly lowered.

Furthermore, in this embodiment, the flow rate of the heating-water 60 supplied to the boiler-side heat exchanger 61 and the flow rate of the heating-water 60 supplied to the turbine-side heat exchanger 65 can be controlled, respectively, by using the heating-water control valve 76 provided in the second heating-medium supply line 63. Namely, the heating-water 60 that has been heated and supplied from the turbine-side heat exchanger 65 to the steam-water separation header 75 for the heating-medium can be removed, as the water, by the steam-water separation header 75 for the heating-medium. Thus, the flow rate of the heating-steam 60a supplied from the boiler-side heat exchanger 61 to the reboiler 49 can be well controlled. As a result, the flow rate of the heating-steam 60a supplied to the reboiler 49 can be controlled in an appropriately stabilized condition.

In the second embodiment, one exemplary case, in which one end of the deaerated steam supply line 70 is connected with the deaerator 29, while the other end of the deaerated steam supply line 70 is connected with the outlet of the intermediate pressure turbine 22, has been discussed. However, this embodiment is not limited to such an aspect. For instance, the other end of the deaerated steam supply line 70 may be connected with the inlet of the crossover pipe 25, so that the deaerated steam 71 taken out from the deaerator 29 can be supplied to the crossover pipe 25. It should be appreciated that this configuration can effectively prevent the water droplets from entering the low pressure turbine 23, via the crossover pipe 25.

Third Embodiment

Now, referring to FIG. 3, the carbon-dioxide-capture-type steam power generation system according to a third embodiment of the present invention will be described.

Figure 3:
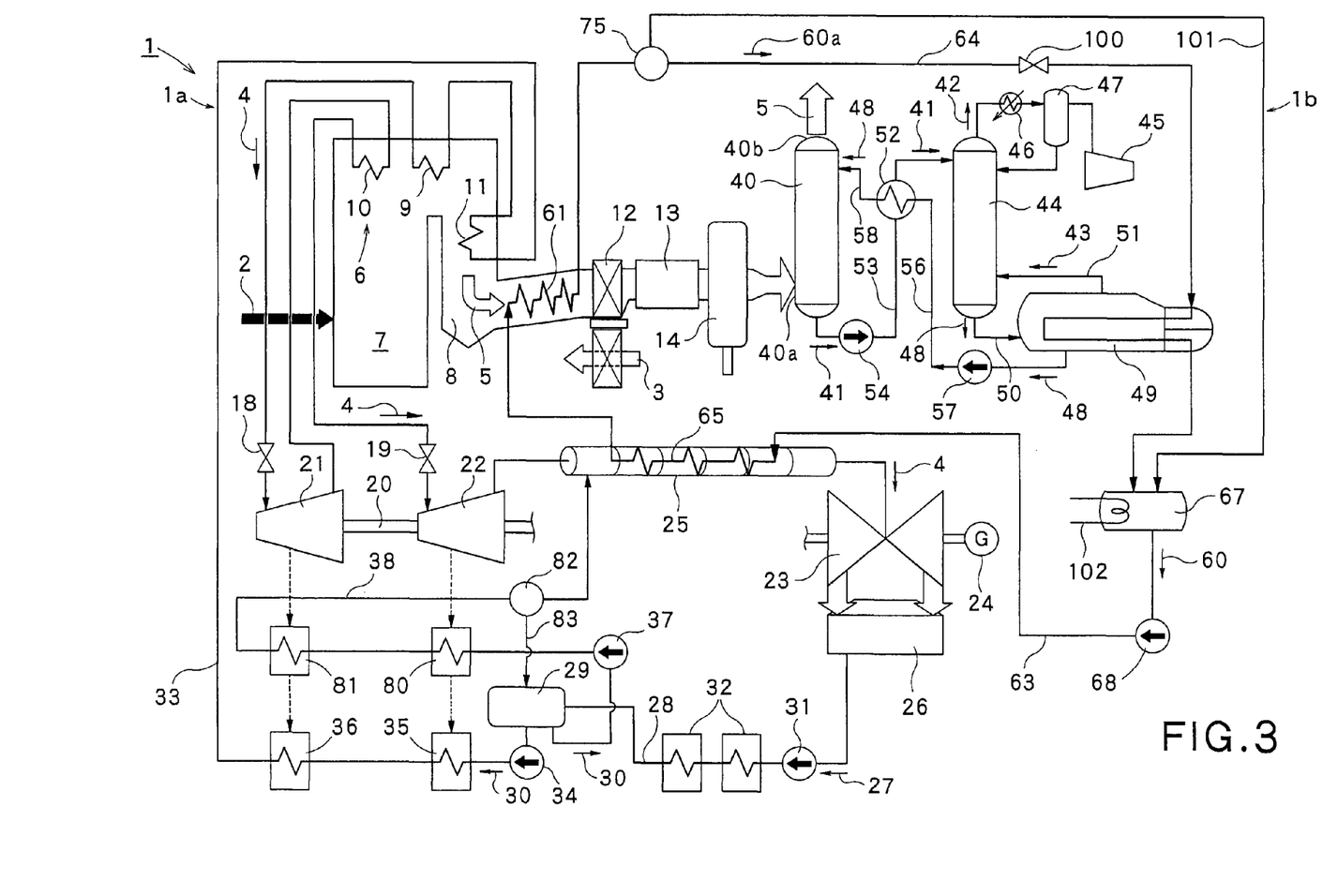
FIG. 3 is a diagram illustrating general construction of the carbon-dioxide-capture-type steam power generation system according to a third embodiment of the present invention.

The third embodiment shown in FIG. 3 is different from the first embodiment shown in FIG. 1, mainly in that a deaerated water-steam heater heating the deaerated water-steam taken out from the deaerator is provided in the deaerated water-steam supply line, and a steam-water separation header for the deaerated water-steam, separating the water from the deaerated water-steam, is provided on the downstream side of the deaerated water-steam heater. In regard to the other construction, however, the third embodiment is substantially the same as the first embodiment. It is noted that like parts depicted in FIG. 3 are respectively designated by like reference numerals respectively assigned to those depicted in FIG. 1, and such parts will not be further described below.

In the carbon-dioxide-capture-type steam power generation system 1 shown in FIG. 3, a first deaerated water-steam heater 80 is provided in the deaerated water-steam supply line 38. The first deaerated water-steam heater 80 is configured to heat the deaerated water-steam 30 that has been taken out by the deaerated water-steam pump 37 and vaporize at least partly the deaerated water-steam 30, by utilizing the turbine steam 4 (or intermediate pressure extraction steam), as heat source, extracted from the intermediate pressure turbine 22. In this case, the deaerated water-steam 30 has been produced by the deaerator 29 and then partly taken out therefrom, into the deaerated water-steam supply line 38. Further, a second deaerated water-steam heater 81 is provided on the downstream side of the first deaerated water-steam heater 80. The second deaerated water-steam heater 81 is configured to heat the deaerated water-steam 30 heated by the first deaerated water-steam heater 80 and vaporize at least partly the deaerated water-steam 30, by utilizing the turbine steam 4 (or high pressure extraction steam), as heat source, extracted from the high pressure turbine 21. In this way, the deaerated water-steam 30 taken out by the deaerated water-steam pump 37 is heated and a part or all of the deaerated water-steam 30 is vaporized, through the first deaerated water-steam heater 80 and second deaerated water-steam heater 81.

In addition, a steam-water separation header 82 for the deaerated water-steam is provided on the downstream side of the second deaerated water-steam heater 81. The steam-water separation header 82 for the deaerated water-steam is configured to separate the water from the deaerated water-steam 30 heated and vaporized at least partly by the second deaerated water-steam heater 81. Furthermore, a water returning line 83 for the deaerated water-steam is connected between the steam-water separation header 82 for the deaerated water-steam and the deaerator 29. This water returning line 83 for the deaerated water-steam is configured to return the water separated by the steam-water separation header 82 for the deaerated water-steam to the deaerator 29. With such configuration, the vaporized part of the deaerated water-steam 30 taken out by the deaerated water-steam pump 37 can be supplied to the crossover pipe 25.

According to this embodiment, by using the aforementioned steam-water separation header 82 for the deaerated water-steam, the water can be effectively separated from the vaporized part of the deaerated water-steam 30 taken out by the deaerated water-steam pump 37. The vaporized and separated part is supplied to the crossover pipe 25 or the outlet of the intermediate pressure turbine 22. Therefore, this configuration can securely prevent the water droplets from entering the low pressure turbine 23, via the crossover pipe 25.

Further, according to this embodiment, the vaporized part of the deaerated water-steam 30, produced after heated by the first deaerated water-steam heater 80 and the second deaerated water-steam heater 81, can be brought into an substantially saturated and considerably wet state. Therefore, the turbine steam 4 can be always kept in the adequately wet state in the outlet of the low pressure turbine 23.

In this embodiment, one exemplary case has been discussed. That is to say, in this exemplary the first deaerated water-steam heater 80 heating the deaerated water-steam 30 by utilizing the turbine steam 4 (or intermediate pressure extraction steam) extracted from the intermediate pressure turbine 22 and the second deaerated water-steam heater 81 further heating the deaerated water-steam 30 by utilizing the turbine steam 4 (or high pressure extraction steam) extracted from the high pressure turbine 21, is provided in the deaerated water-steam supply line 38. However, this embodiment is not limited to such an aspect. For instance, the deaerated water-steam supply line 38 may be configured to include only one of the first deaerated water-steam heater 80 and second deaerated water-steam heater 81. Also in such a case, the deaerated water-steam 30 can be vaporized, at least partly, by heating the deaerated water-steam 30 provided by the deaerated water-steam pump 37.

This application claims priority from Japanese Patent Application 2008-227376, filed Sep. 4, 2008 and Japanese Patent Application 2009-147974 filed Jun. 22, 2009, which are incorporated herein by reference in their entirety.

The invention claimed is:

1. A carbon-dioxide-capture-type steam power generation system comprising:
   a boiler producing a steam and an exhaust gas by combusting a fuel, the boiler having a flue through which the exhaust gas passes so as to discharge from the boiler;
   an absorbing unit receiving the exhaust gas from the boiler, the absorbing unit being configured to absorb the carbon-dioxide contained in the exhaust gas into an absorbing solution;

a regenerating unit receiving the absorbing solution containing the carbon dioxide from the absorbing unit, the regenerating unit being configured to release the carbon dioxide gas from the absorbing solution absorbing the carbon dioxide and discharge the released carbon dioxide gas from the regenerating unit;

a reboiler receiving a heating-medium as heat source, the reboiler producing a steam by heating the absorbing solution supplied from the regenerating unit and supplying the produced steam to the regenerating unit;

a boiler-side heat exchanger provided between a economizer of the boiler and an air preheater in a flue, the boiler-side heat exchanger heating the heating-medium by the exhaust gas passing therethrough.

2. The carbon-dioxide-capture-type steam power generation system according to claim 1, wherein the boiler has a superheater producing a main steam and a reheater producing a reheated steam, wherein the carbon-dioxide-capture-type steam power generation system further comprises:

a high pressure steam turbine rotating by receiving the main steam;

a intermediate pressure steam turbine rotating by receiving the reheated steam;

a low pressure steam turbine rotating by receiving exhaust steam form the intermediate pressure steam turbine;

a crossover pipe provided between the intermediate pressure steam turbine and the low pressure steam turbine, the crossover pipe supplying the exhaust steam from the intermediate pressure steam turbine to the low pressure steam turbine; and a turbine-side heat exchanger provided in the crossover pipe, the turbine-side heat exchanger heating the heating-medium by the steam passing therethrough, wherein the heating-medium heated by the turbine-side heat exchanger is supplied to the boiler-side heat exchanger and further heated by the boiler-side heat exchanger.

3. The carbon-dioxide-capture-type steam power generation system according to claim 2, further comprising:

a condenser producing a condensation by cooling the exhaust steam supplied from the low pressure steam turbine;

a deaerator producing a deaerated water-steam by deaerating the condensation;

a deaerated water-steam pump taking out a part of the deaerated water-steam produced by the deaerator; and a deaerated water-steam supply line provided on a downstream side of the deaerated water-steam pump, the deaerated water supply line directing the part of the deaerated water-steam taken out by the deaerated water-steam pump toward the steam which is supplied from the intermediate pressure steam turbine to the low pressure steam turbine.

4. The carbon-dioxide-capture-type steam power generation system according to claim 3, wherein at least one deaerated water-steam heater is provided in the deaerated water-steam supply line, the deaerated water-steam heater being heating the deaerated water-steam taken out by the deaerated water-steam pump, by the steam extracted from at least one of the high pressure steam turbine and intermediate pressure steam turbine.

5. The carbon-dioxide-capture-type steam power generation system according to claim 4, wherein a steam-water separation header for the deaerated water-steam is provided on downstream side of the deaerated water-steam heater in the deaerated water-steam supply line, the steam-water separation header for the deaerated water-steam separating water from the deaerated water-steam heated by the deaerated water-steam heater and vaporized at least partly, and wherein a water returning line for the deaerated water-steam is connected between the steam-water separation header for the deaerated water-steam and the deaerator, the water returning line for the deaerated water-steam returning the water separated by the steam-water separation header for the deaerated water-steam to the deaerator.

6. The carbon-dioxide-capture-type steam power generation system according to claim 2, further comprising:

a condenser producing a condensation by cooling the exhaust steam supplied from the low pressure steam turbine;

a deaerator producing a deaerated water-steam and deaerated steam by deaerating the condensation; and a deaerated steam supply line taking out the deaerated steam from the deaerator and then directing the deaerated steam toward the steam which is supplied from the intermediate pressure steam turbine to the low pressure steam turbine.

7. The carbon-dioxide-capture-type steam power generation system according to claim 1, wherein the boiler has a superheater producing a main steam and a reheater producing a reheated steam, wherein the carbon-dioxide-capture-type steam power generation system further comprises:

a high pressure steam turbine rotating by receiving the main steam;

a intermediate pressure steam turbine rotating by receiving the reheated steam;

a low pressure steam turbine rotating by receiving exhaust steam form the intermediate pressure steam turbine;

a crossover pipe provided between the intermediate pressure steam turbine and the low pressure steam turbine, the crossover pipe supplying the exhaust steam from the intermediate pressure steam turbine to the low pressure steam turbine; and a turbine-side heat exchanger provided in the crossover pipe, the turbine-side heat exchanger heating the heating-medium by the steam passing therethrough, wherein the boiler-side heat exchanger and the turbine-side heat exchanger are arranged in parallel to each other, and wherein the heating-medium heated, by the boiler-side heat exchanger and the heating-medium heated by the turbine-side heat exchanger are flowed into each other and then supplied to the reboiler as heat source.

8. The carbon-dioxide-capture-type steam power generation system according to claim 7, further comprising:

a condenser producing a condensation by cooling the exhaust steam supplied from the low pressure steam turbine;

a deaerator producing a deaerated water-steam by deaerating the condensation;

a deaerated water-steam pump taking out a part of the deaerated water-steam produced by the deaerator; and a deaerated water-steam supply line provided on a downstream side of the deaerated water-steam pump, the deaerated water supply line directing the part of the deaerated water-steam taken out by the deaerated water-steam pump toward the steam which is supplied from the intermediate pressure steam turbine to the low pressure steam turbine.

9. The carbon-dioxide-capture-type steam power generation system according to claim 8, wherein at least one deaerated water-steam heater is provided in the deaerated water-steam supply line, the deaerated water-steam heater being heating the deaerated water-steam taken out by the deaerated water-steam pump, by the steam extracted from at least one of the high pressure steam turbine and intermediate pressure steam turbine.

10. The carbon-dioxide-capture-type steam power generation system according to claim 9,
wherein a steam-water separation header for the deaerated water-steam is provided on downstream side of the deaerated water-steam heater in the deaerated water-steam supply line, the steam-water separation header for the deaerated water-steam separating water from the deaerated water-steam heated by the deaerated water-steam heater and vaporized at least partly, and
wherein a water returning line for the deaerated water-steam is connected between the steam-water separation header for the deaerated water-steam and the deaerator, the water returning line for the deaerated water-steam returning the water separated by the steam-water separation header for the deaerated water-steam to the deaerator.

11. The carbon-dioxide-capture-type steam power generation system according to claim 7, further comprising:
a condenser producing a condensation by cooling the exhaust steam supplied from the low pressure steam turbine;
a deaerator producing a deaerated water-steam and deaerated steam by deaerating the condensation; and
a deaerated steam supply line taking out the deaerated steam from the deaerator and then directing the deaerated steam toward the steam which is supplied from the intermediate pressure steam turbine to the low pressure steam turbine.

* * * * *